(12) United States Patent
Schwanke

(10) Patent No.: US 8,773,646 B2
(45) Date of Patent: Jul. 8, 2014

(54) FIBER OPTIC SCANNER

(75) Inventor: Ulrich Schwanke, Markdorf (DE)

(73) Assignee: Eads Deutschland GmbH, Ottobrunn (DE)

( * ) Notice: Subject to any disclaimer, the term of this patent is extended or adjusted under 35 U.S.C. 154(b) by 876 days.

(21) Appl. No.: 12/900,954

(22) Filed: Oct. 8, 2010

(65) Prior Publication Data

US 2011/0085154 A1    Apr. 14, 2011

(30) Foreign Application Priority Data

Oct. 10, 2009   (EP) ..................................... 09012847

(51) Int. Cl.
*G01C 3/08*   (2006.01)

(52) U.S. Cl.
USPC .............. 356/4.1; 356/2; 356/4.01; 356/5.01; 356/5.15

(58) Field of Classification Search
USPC ...................... 356/2, 4.01–4.1, 5.01–5.15, 28; 250/227.26; 352/39; 385/115
See application file for complete search history.

(56) References Cited

U.S. PATENT DOCUMENTS

| | | | |
|---|---|---|---|
| 3,244,085 A * | 4/1966 | Pulfer | 396/19 |
| 3,325,594 A | 6/1967 | Goldhanuner et al. | |
| 4,199,253 A * | 4/1980 | Ross | 356/5.04 |
| 4,311,384 A * | 1/1982 | Keene | 356/139.08 |
| 4,687,325 A * | 8/1987 | Corby, Jr. | 356/3.09 |
| 5,109,459 A * | 4/1992 | Eibert et al. | 385/115 |
| 5,225,876 A * | 7/1993 | Lux et al. | 396/109 |
| 5,288,991 A * | 2/1994 | King et al. | 250/216 |
| 5,459,505 A * | 10/1995 | Ballegaard et al. | 347/260 |

(Continued)

FOREIGN PATENT DOCUMENTS

| | | |
|---|---|---|
| DE | 1 931 273 | 1/1970 |
| DE | 33 32 909 | 3/1985 |

(Continued)

OTHER PUBLICATIONS

Schnadt et al.. "Unique Airborne Fiber Scanner Techique for Application-Oriented LIDAR Products". Internatinal archives of Photogrammetry. Remote Sensing and Spatial Information Sciences, International Society for Photogrammetry and Remote Sensing, Oct. 3, 2004, pp. 19-23.

European Patent Office (EPO) Office action, dated Mar. 17, 2010 along with an english translation thereof.

*Primary Examiner* — Isam Alsomiri
*Assistant Examiner* — Assres H Woldemaryam
(74) *Attorney, Agent, or Firm* — Greenblum & Bernstein, P.L.C.

(57) ABSTRACT

Fiber optic scanner and method for transmitting and receiving optical signals and range imaging camera including fiber optic scanner. The fiber optic scanner includes a light guide array including individual light guides arranged such that a first end has first ends of the individual light guides arranged in an image plane of collimating optics and a second end has second ends of the individual light guides arranged in a circular manner. A central light guide includes a first end arranged at a center of the circularly arranged second ends of the individual light guides and a motor driven reflector arranged to guide light emerging from the circularly arranged ends of the individual light guides into the central light guide. The central light guide further includes two coaxially arranged cross sectional areas that are structured and arranged to guide transmitted light through a central one of the two coaxially arranged cross sectional areas and to guide received light through an outer one of the two coaxially arranged cross sectional areas.

22 Claims, 6 Drawing Sheets

(56) References Cited

U.S. PATENT DOCUMENTS

| | | | |
|---|---|---|---|
| 5,887,102 A * | 3/1999 | Mueller et al. | 385/115 |
| 5,889,593 A * | 3/1999 | Bareket | 356/445 |
| 6,246,658 B1 * | 6/2001 | White et al. | 369/112.27 |
| 6,559,438 B1 * | 5/2003 | Drobot et al. | 250/234 |
| 6,711,318 B2 * | 3/2004 | Hamerly et al. | 385/18 |
| 8,063,368 B1 * | 11/2011 | Youngs et al. | 250/334 |

FOREIGN PATENT DOCUMENTS

| | | |
|---|---|---|
| DE | 39 42 770 | 7/1991 |
| DE | 39 42 771 | 7/1991 |
| GB | 1 008 337 | 10/1965 |

* cited by examiner

FIBER OPTIC SCANNER

CROSS-REFERENCE TO RELATED APPLICATIONS

The present application claims priority under 35 U.S.C. §119(a) of European Patent Application No. 09 012 847.1 filed Oct. 10, 2009, the disclosure of which is expressly incorporated by reference herein in its entirety.

BACKGROUND OF THE INVENTION

1. Field of the Invention

The invention relates to a fiber optic scanner according to the preamble of patent claim 1, and to a range imaging camera (also denoted as 3D laser radar in the literature) in which such a fiber optic scanner is applied.

2. Discussion of Background Information

Fiber optic scanners are optomechanical units which serve to lead and deflect optical signals. In the case of a fiber optic line scanner, it is possible, for example, for the optical information falling onto a line to be converted into a sequence of optical pulses in a glass fiber.

The use of a fiber optic line scanner with a biaxial optical transceiver system for the purpose of producing 3D laser radar images is known, see, e.g., DE 39 42 770 C1 and/or its counterpart U.S. Pat. No. 5,225,876; and DE 39 42 771 C1 and/or its counterpart U.S. Pat. No. 5,109,459, the disclosures of which are expressly incorporated by reference herein in their entireties. The fiber optic scanner of the known systems includes separately from one another a transmit part for emitting laser light and a receive part, designed symmetrically therewith, for receiving the light reflected at the scene. The transmit part and receive part respectively include an array of a plurality of light guides whose first ends are arranged linearly and whose second ends are arranged annularly. The second ends of each array therefore form an annular structure at whose center the end of a central light guide is located. The central light guide is connected to a light source in the case of the transmit part, and to the detector in the case of the receive part. Moreover, a motor-driven rotating mirror is present in each case for transmit part and receive part in a fashion tilted with respect to its rotation axis. The rotating mirror is aligned in such a way that in the transmit part the laser light emerging from the central light guide is directed sequentially onto the circularly arranged ends of the light guide array. Conversely, upon receipt of the incoming light in the receive part the light emerging from the ends of the circular array is guided into the central light guide.

In order to be able to build a 3D laser radar more cost effectively, it is necessary to reduce the number of optical components, these being very costly, as a rule.

SUMMARY OF THE EMBODIMENTS

Embodiments of the invention modify the known fiber optic scanner such that the outlay for the requisite optical components is substantially reduced. Further, advantageous designs of the fiber optic scanner, as well as a range imaging camera based on the fiber optic scanner, are described herein.

The inventive scanner is distinguished in that it is designed as a coaxial system. This means that the separation into transmit optics and receive optics is abolished. Rather, what is now present is only one optics which is used alternately both to transmit and to receive the laser signals.

The number of the optical elements used in the beam path therefore drops dramatically, as do the production costs of the system. Moreover, with this inventive design it is possible to greatly reduce the volume of the overall unit.

The coaxial transceiver system is implemented by virtue of the fact that the central light guide (which—unlike in the prior art—is now present only once) is split up into two coaxial cross sectional areas, the transmitted light being guided through the central cross sectional area, and the received light being guided through the outer cross sectional area.

The following advantages, in particular, are associated with the invention:

Simplification of the previous biaxial laser radars by reduction of the number of optical components, combined with a compression of the overall size and of the weight of the overall unit.

Reduction of the production costs.

The functionality of the system in dependence on the temperature is rendered less critical.

A more compact, more flexible design of the optics unit is possible.

The complicated adjustment of the optics unit is eliminated.

Embodiments of the invention are directed to a fiber optic scanner for transmitting and receiving optical signals. The fiber optic scanner includes a light guide array including individual light guides arranged such that a first end has first ends of the individual light guides arranged in an image plane of collimating optics and a second end has second ends of the individual light guides arranged in a circular manner. A central light guide includes a first end arranged at a center of the circularly arranged second ends of the individual light guides and a motor driven reflector arranged to guide light emerging from the circularly arranged ends of the individual light guides into the central light guide. The central light guide further includes two coaxially arranged cross sectional areas that are structured and arranged to guide transmitted light through a central one of the two coaxially arranged cross sectional areas and to guide received light through an outer one of the two coaxially arranged cross sectional areas.

According to aspects of the embodiments, the central cross sectional area of the central light guide can include at least one of an optical guide and a fiber taper.

In accordance with other embodiments, a fiber optic coupler may be coupled to the central light guide and can be structured and arranged to separate the central cross sectional area and the outer cross sectional area of the central light guide from one another. The central light guide may include a bundle of optical fibers that are arranged such that a central optical fiber is surrounded by the remaining optical fibers of the bundle, so that the central optical fiber forms the central cross sectional area of the central light guide, and the remaining optical fibers of the bundle form the outer cross sectional area of the central light guide. Further, at the fiber optic coupler, the central optical fiber can be led out of the bundle. In other aspects of the embodiments, the central light guide may further include an inner optical fiber and a tubular light guide having an interior into which the optical fiber is inserted. The tubular light guide may have an expansion region in which the tubular light guide expands over a specific distance at the fiber optic coupler, and the inner optical fiber can be led out of the tubular light guide in the expansion region. In still other aspects of the embodiments, the outer cross sectional area of the central light guide can be interrupted at the fiber optic coupler over a specific distance that is bridged by an optical projection, and the central cross sectional area of the central light guide may be led out of the outer cross sectional area in a region of this interruption. According to still further aspects, a detector and an optical switch can be connected between the fiber optic coupler and the detector. The optical switch may be synchronized with a light source to prevent light from the outer cross sectional area of the central light guide falling onto the detector during a transmission phase of the light source. Further, the optical switch can include an incremental chopper disk arranged so that the optical signal of the outer cross sectional area of the central light guide passes through the incremental chopper disk at least one time. Also, an optical projection can be structured and arranged to guide the optical signal through the incremental chopper disk, and a motor can drive the reflector and may have a shaft on which the incremental chopper disk is seated.

Embodiments of the instant invention are directed to a range imaging camera that includes the fiber optic scanner as described above. The range imaging camera further includes a scanning device for two-dimensional scanning of a scene, such that light coming from the scanning device is projected by the collimating optics onto the first ends of the individual light guides.

In accordance with other embodiments, the collimating optics may include at least two optical elements. Further, the two-dimensional scanning device can be arranged in a beam path of the at least two optical elements, and the two-dimensional scanning device can be arranged in a beam path of the collimating optics.

Embodiments of the invention are directed to a method for transmitting and receiving optical signals. The method includes guiding light between a first end of an array formed by first ends of plural light guides arranged in an image plane of collimating optics and a second end of the array formed by second ends of the plural light guides arranged in a circular manner, and guiding transmitted light through a central portion of a coaxial light guide located at a center of the circularly arranged second ends of plural light guides and receiving reflected light through an outer portion of the coaxial light guide.

According to other embodiments of the invention, the method can further include guiding light from the second end of the array to the outer portion of the coaxial light guide, and guiding light from the central portion of the coaxial light guide to the second end of the array.

In accordance with still yet other embodiments of the present invention, the method can include separating the outer portion of the coaxial light guide from the central portion of the outer coaxial light guide, guiding a beam from the separated outer coaxial light guide toward a detector, and interrupting a beam path of the separated outer coaxial light guide before the beam reaches the detector. Further, the beam path may be interrupted a plurality of times before the beam reaches the detector.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
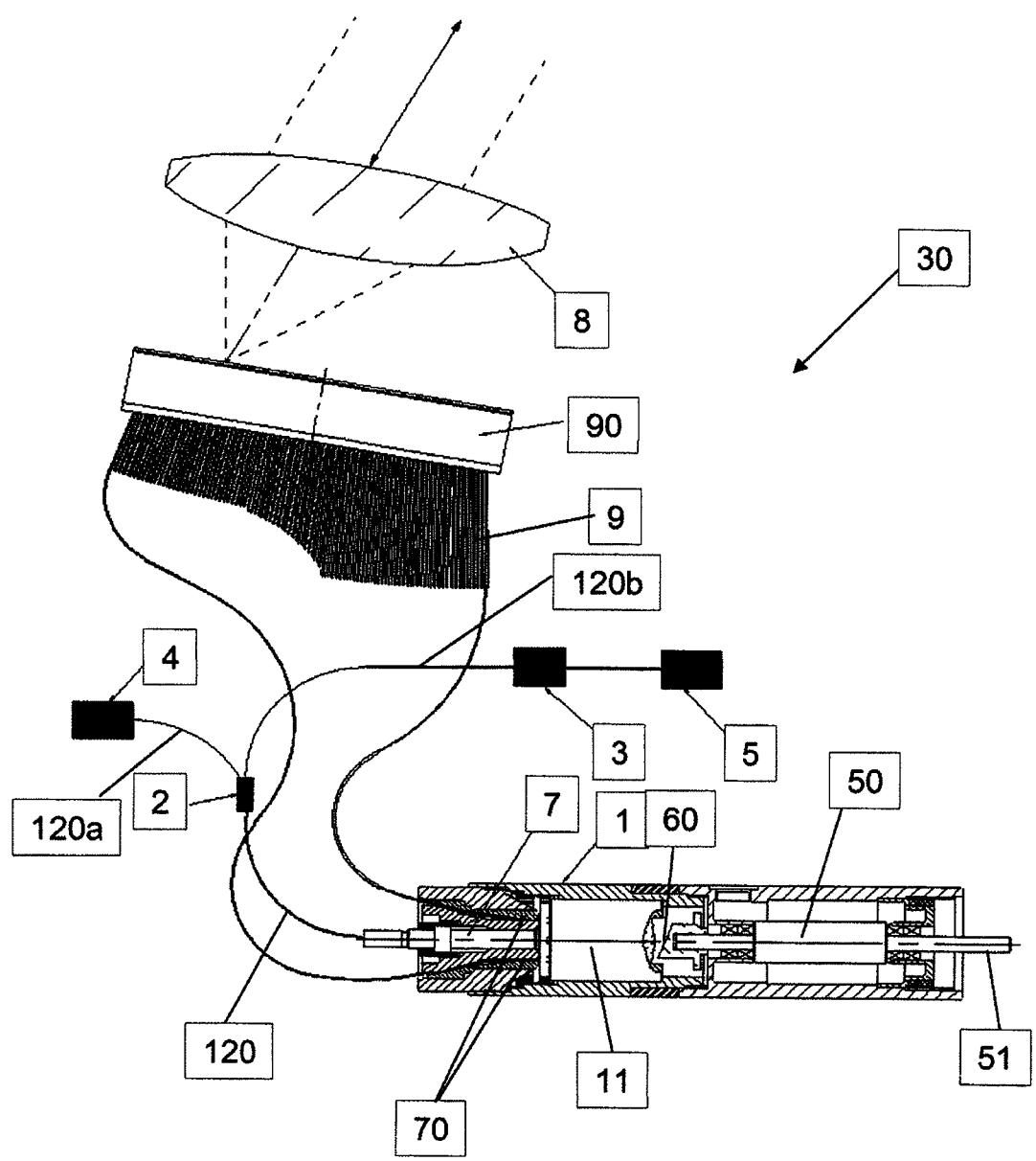
FIG. 1 illustrates a first design of the inventive coaxial fiber scanner.

FIG. 1 shows a coaxial fiber scanner in accordance with the subject matter of the embodiments that includes an array 9 of individual light guides. The design of the fiber scanner illustrated in FIG. 1 can be a line scanner, such that first ends 90 of the fibers of the fiber array 9 are arranged linearly. However, depending on the particular application, the arrangement of these fiber ends 90 can be as desired. For example, fiber ends 90 can be arranged as a double line, curved line, in the shape of a cross or circle, or as a two-dimensional array or in some other free configuration.

Figure 2:
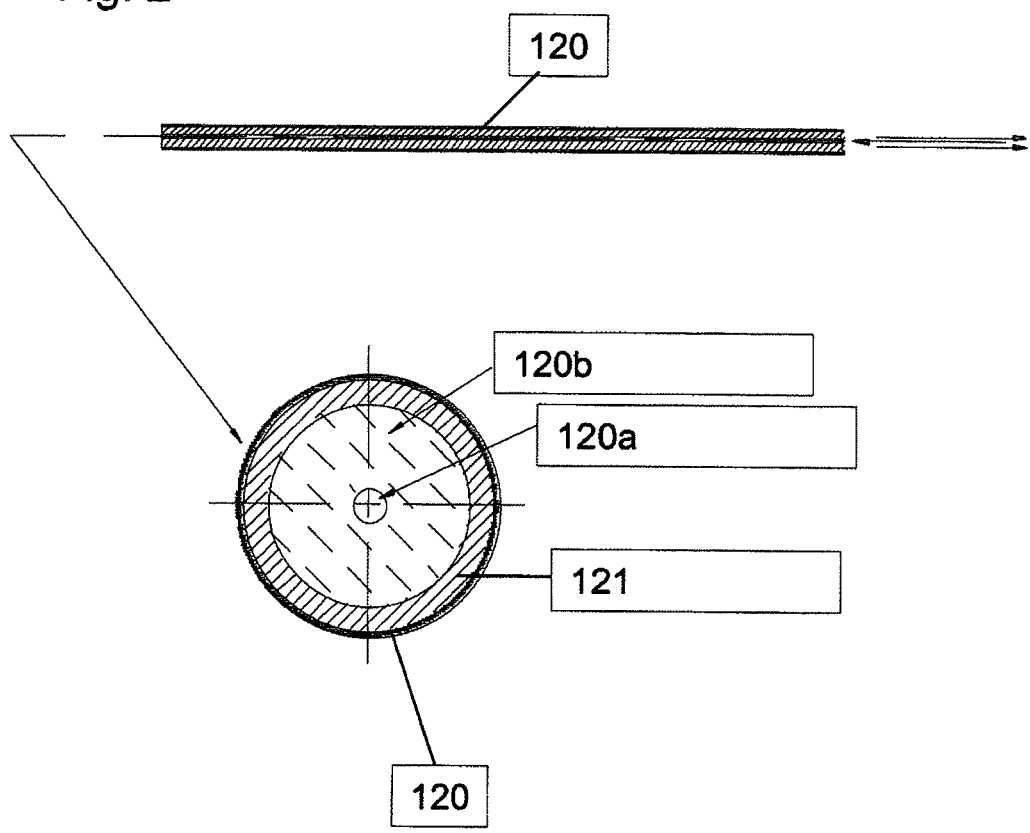
FIG. 2 illustrates a cross section of the central light guide with its division split up into two coaxial cross sectional areas for transmission and reception.

Second ends 70 of the fibers of array 9 are arranged circularly inside a central part 1 of the fiber scanner. Linearly arranged ends 90 are arranged in the focal plane of an objective 8. One end of central light guide 120 is fixed with the aid of a plug 7 in the center of circularly arranged ends 70. Central light guide 120 is split up into two coaxial cross sectional areas 120a, 120b for transmission and reception, see FIG. 2. The splitting of central light guide 120 into its two coaxial cross sectional areas 120a, 120b is performed or occurs at a fiber optic coupler 2. In this manner, central cross sectional area 120a can be connected to a light source 4, e.g., a pulsed laser diode or a fiber laser, for emitting light, and outer cross sectional area 120b can be connected to a detector 5 for the received light. Reference 121 of FIG. 2 denotes an outer protective sleeve of light guide 120.

Present opposite the end of central optical fiber 120 is a reflector, which can be designed, e.g., as a rotating mirror 60 that is arranged on the axis 51 of a drive 50, e.g., an electric motor. Rotating mirror 60 can be tilted with respect to its rotational axis. The drive for rotating mirror 60 is arranged in central part 1 of the fiber scanner. In the transmit mode of the fiber optic scanner, after traversing optics 11, the light pulses emerging from central fiber 120 are sequentially directed by rotating mirror 60 onto circularly arranged ends 70 of light guide array 9 and coupled into the corresponding fibers. The synchronization of light source 4 and rotating mirror 60 can be performed by a mark detector, as described in, e.g., DE 39 42 771 C1 and/or its counterpart U.S. Pat. No. 5,109,459, the disclosures of which have been expressly incorporated by reference herein in their entireties. The coupled light leaves the fiber scanner at linear ends 90 of fiber array 9 by collimating lens or objective 8.

In the reception mode, the light path runs in the reverse direction. The light coupled in at linearly arranged ends 90, i.e., the light of the light source that is reflected at the scene, in the case of a laser radar, leaves the light guides of array 9 at circularly arranged ends 70 and falls onto rotating mirror 60. The optical signals emerging from the individual light guides of array 9 are sequentially directed onto the end of central light guide 120 by rotating mirror 60. The received optical signal is directed onto the outer, annular cross sectional area 120b of central light guide 120 owing to the finite timing between emission of the optical signal and reception of the reflected signal within which the rotating mirror rotates further. From there, the light runs up to detector 5 through fiber optic coupler 2.

In the case of the fiber scanner described, the principle outlay on beam splitting is restricted to only one component, i.e., coupler 2. Moreover, it is possible to dimension coupler 2 so that high optical efficiencies (>50%) can be reached with regard to the optical transmission. If direct crosstalk between transmit zone and receive zone is taken into account when dimensioning such a coupler 2, it is advantageous to displace the splitting plane of this coupler into plug 7, as illustrated in the design according to FIG. 6.

In order to protect the detector against self dazzling by the light source, a fast optical switch 3 can be advantageously integrated between detector 5 and the fiber optic coupler 2. This switch is synchronized with the transmitted laser pulses and is capable of absorbing the disturbing self dazzling reflections and of transmitting the useful signal, typically substantially weaker.

Figure 3:
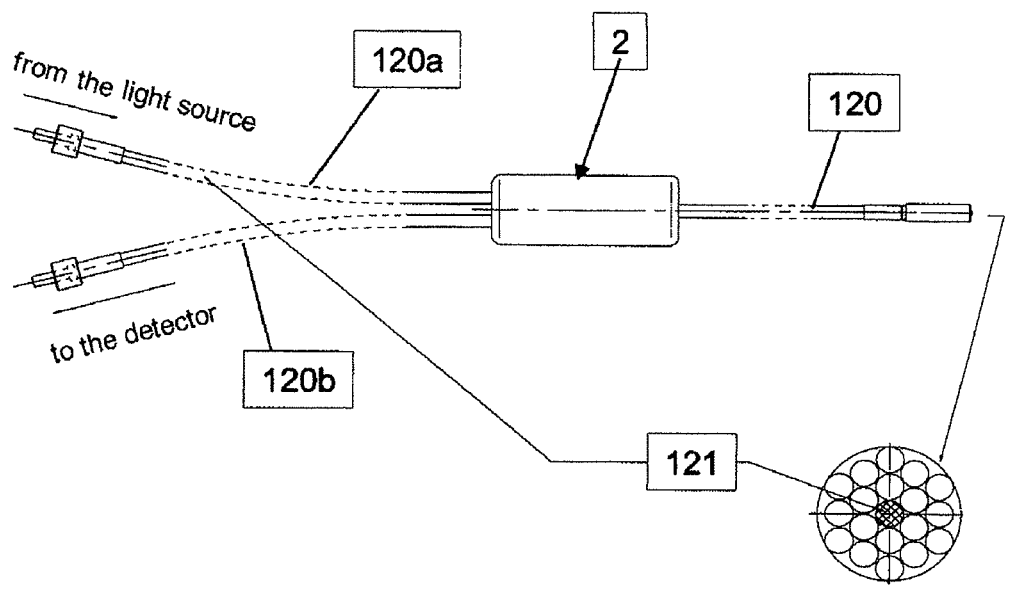
FIGS. 3 to 5 illustrate three different designs for the implementation of a fiber optic coupler for the separation of the cross sectional areas for transmission and reception of the central light guide.
Figure 4:
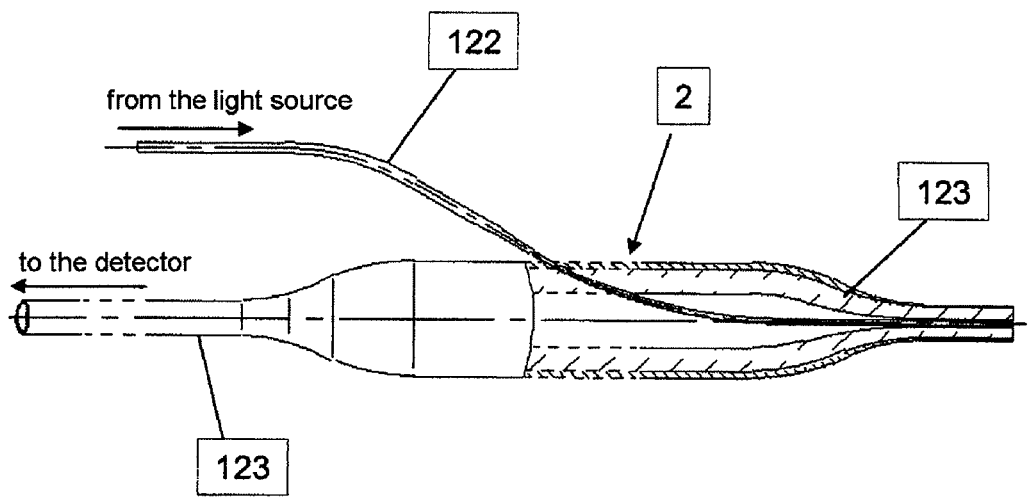
Figure 5:
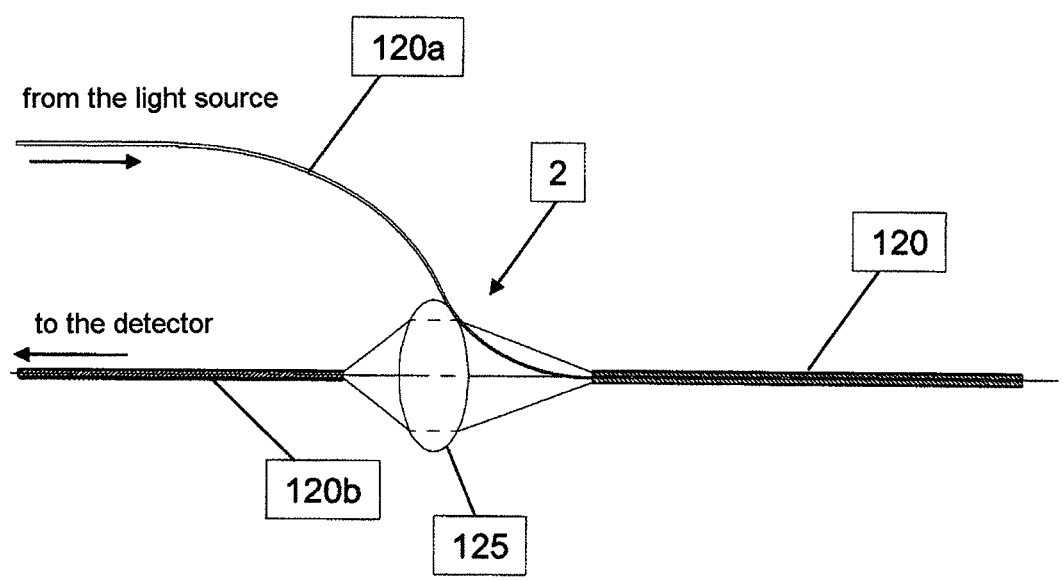

Three examples for the implementation of the fiber optic coupler are illustrated in FIGS. 3 to 5.

In accordance with FIG. 3, coupler 2 can be produced by central light guide 120, which includes a bundle of individual optical fibers, and more particularly, a central optical fiber 121 forming central cross sectional area 120a for the transmission, and surrounding optical fibers together forming outer cross sectional area 120b for reception. According to this design, central fiber 121 can then easily be led out from fiber bundle 120 and led to light source 4.

Another possibility of the implementation of coupler 2 can include an arrangement in which a single central optical fiber 122 is located in a central bore inside another light guide 123, as illustrated in FIG. 4. Central optical fiber 122 can be led out of the light guide 123 surrounding it at a point at which the diameter of the surrounding light guide has been expanded under the action of heat.

The optical efficiency of the design according to FIG. 4 is higher in this case than that in accordance with FIG. 3 because of the reduction of the non-guiding fractions.

Moreover, as shown in FIG. 5, an optical projection can be utilized to split the two cross sectional areas for transmission and reception. To this end, outer cross sectional area 120b of central light guide 120 may be interrupted over a specific distance. This distance can be bridged by an optical projection, e.g., a lens 125. Central cross sectional area 120b can be led out at this interruption point of outer cross sectional area 120a.

In all variants, a single optical fiber or a fiber taper can advantageously be used as central cross sectional area of the central light guide. The fiber taper facilitates the decoupling of the laser power and can further improve the splitting efficiency.

The fast optical switch 3, generally described above with regard to the embodiment depicted in FIG. 1, keeps the reflected disturbing reflections which arise somewhere in the system, e.g., resulting from stray light or retroreflections at optical surfaces such as lenses or glass fiber ends, away from the detector at the instant of the laser pulse. In practice, this means, e.g., an interruption of a fiber link for a time period <100 ns with an attenuation measure >80 dB. Consideration as components is given to those systems capable of interrupting the fiber link between the fiber optic coupler and the detector with a controllable speed and which themselves produce stray light only minimally in so doing. A particularly advantageous design of the inventive fiber optic scanner according to embodiments of the invention can include a fast optical switch on the basis of an ultraprecise shutter, as shown in FIG. 6.

Figure 6:
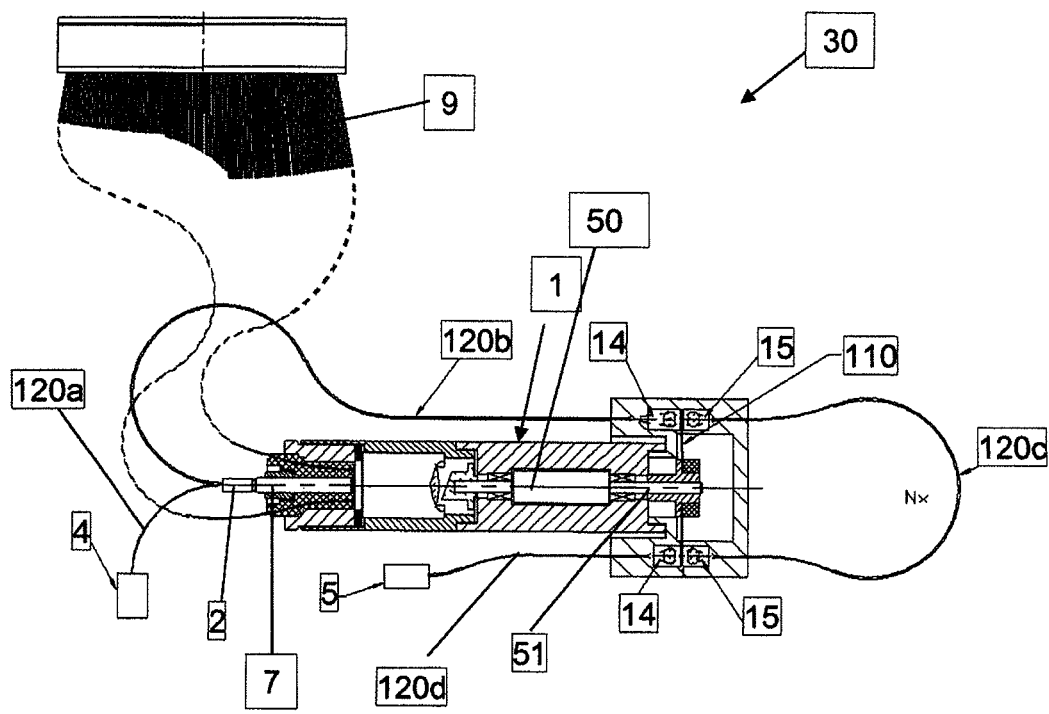
FIG. 6 illustrates a second design of the inventive coaxial fiber scanner with a fast optical switch for the protection of the optical detector.

The basic setup of the design shown in FIG. 6 generally corresponds to that of FIG. 1 in that it includes fiber array 9, central part 1, detector 5 and fiber optic coupler 2 for separating the transmitted signal and received signal. However, in the design shown in FIG. 6, the fiber optic coupler 2 may be integrated in the plug 7 for coupling the central light guide to the central part 1.

In order to implement the optical switch for the protection of detector 5, a holder with an incremental chopper disk 110 is mounted on the free shaft end of drive 50. The number of the line pairs (or openings) on incremental chopper disk 110 corresponds to the number of the fibers within fiber array 9. Chopper disk 110 interrupts the beam path of fiber link 120b from coupler 2 to detector 5. The rotation of motor shaft 51 produces alternating time windows in which the light is either transmitted or blocked (absorbed). Since chopper disk 110 is seated on the same shaft as rotating mirror 60, a perfect synchronization is possible.

Since stray light can result at the interruption point, the contrast between transmission and absorption is reduced. In order to increase the contrast, fiber link 120b to be interrupted is led several times over or through chopper disk 110, where it is interrupted synchronously several times on the disk circumference. In the non-limiting example depicted in the embodiment of FIG. 6, fiber link 120b is led to chopper disk 11 two times.

In order to adapt the switching times and to increase the efficiency of the transmission, an intermediate projection employing microoptics 14, 15 is provided in the design shown during passage through chopper disk 110. The projection scale of the intermediate projection is determined by a combination of microoptics 14 and 15, and can be varied between 1:1 and as desired. Gradient optics, refractive optics, reflective optics, diffractive optics or a combination thereof can be used as microoptics 14, 15.

As incremental chopper disk 110 is to be precisely synchronized with the laser pulses of transmitter 4, a stable rotational speed of motor 50 is advantageous. Again, the laser pulse of the light source 4 can optionally be synchronized with the edge of the increments of chopper disk 110, in which the latter actively interrupts the beam path of fiber link 120b.

Fiber link 120c, shown in FIG. 6, for the transmission of the optical power between two passages of the optical signal through chopper disk 110 can also be replaced by light guide rods or optical deflection prisms. When such components are used, it will be necessary to adapt the projection properties of the microoptics correspondingly.

In general, it is also possible to use electrooptical methods such as Pockels or Kerr cells as fast switches. Alternatively, acoustooptical systems or MEMS (Micro-Electro-Mechanical Systems) and/or OMEMS (Optical-Micro-Electro-Mechanical Systems) can also be used. Integrated optical systems come into question as a further alternative, since they permit an ideal fiber optic connection with the fiber link 120*d* leading to the detector.

The inventive fiber optic scanner can be an important component of a laser radar or a range imaging camera. A range imaging camera is an instrument for scanning and measuring the range of a space or a scene in the field of view of the camera. The range measurement is based on the travel time measurement principle by one or more light sources and detectors. The range or a range value can be determined by determining the time interval between radiated and received light, reflected from the object to be projected, and from knowledge of the speed of light. A matrix of range values (corresponding to the range image) results from the fact that a pointwise scanning is carried out over the field of view of the camera.

By way of example, first ends 90 of the fibers of the fiber array 9 can form a two-dimensional grid for a two-dimensional scanning of the scene.

In the case of a line scanner, i.e., given a linear arrangement of first ends 90 of the fibers of fiber array 9, an additional two-dimensional scanning device, e.g., a pivotable mirror, which can be referred to as scanning mirror, can be utilized as required, see, e.g., DE 39 42 770 A1 and/or its counterpart U.S. Pat. No. 5,225,876, the disclosures of which have been expressly incorporated by reference herein in their entireties. The linear scanning prescribed by the linear arrangement of the fiber ends of fiber array 9 is expanded to a two-dimensional scanning by the rotatability of the scanning mirror. In this case, a specific line of the scene image to be generated belongs to each angular setting of the rotating mirror.

The inventive setup of the fiber optic scanner enables novel possibilities for the reduction of the overall size of the optical front end of such a laser radar or range imaging camera. A particularly advantageous design is illustrated in FIG. 7.

When use is made of the inventive fiber scanner, scanning mirror 31 can now be arranged in the convergent (in the case of reception) or divergent (in the case of transmission) beam path of the collimating optics, and thereby decreases substantially in overall size.

Figure 7:
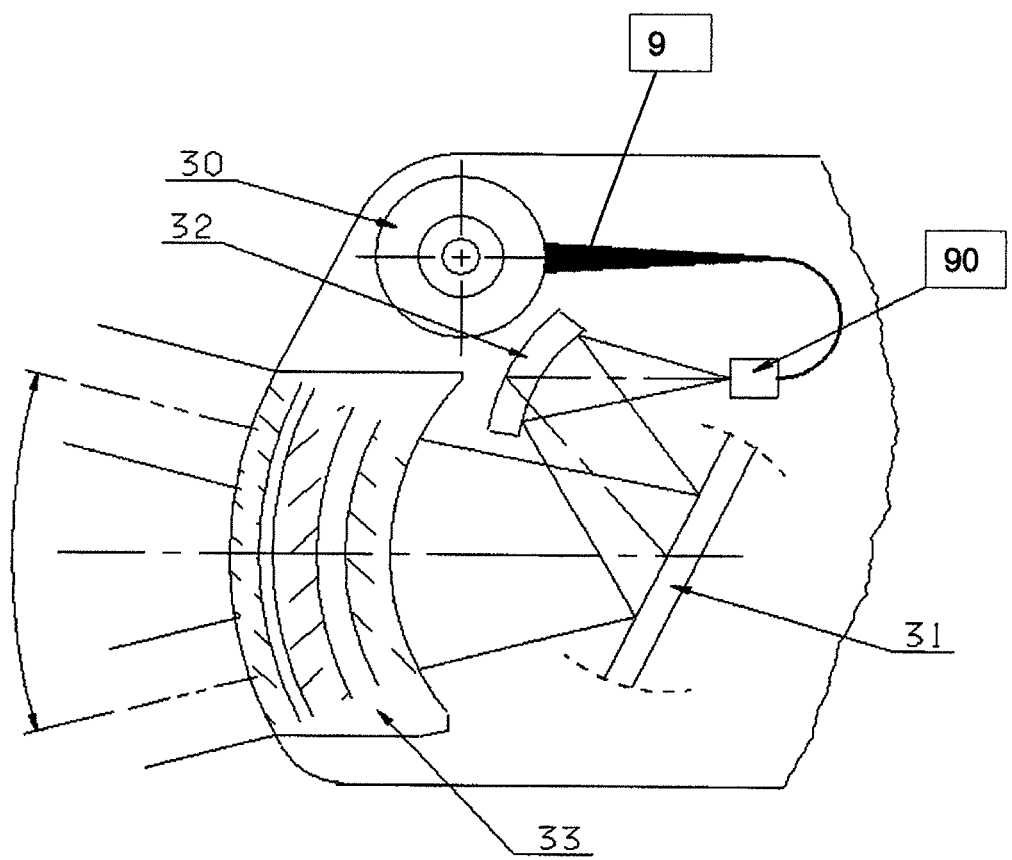
FIG. 7 illustrates the design of the optical front end of a range imaging camera which comprises an inventive fiber scanner.

As is likewise seen from FIG. 7, the collimating optics can advantageously be split up into a plurality of components 32,33. In the case shown, the collimating optics comprises two elements: a first element 33 at the front side of the front end, and a further element 32 between scanning mirror 31 and fiber scanner 30. Both named elements of the collimating optics are advantageously a cylindrical, reflecting component. First element 33 is advantageously integrated into the protector disk of the front end. It can include a plurality of layers in the design shown. These can be formed such that they can serve for the correction of further collimating element 32. Also rendered possible is the use of a toroidal optics or of optical elements with free-form surfaces. Solutions such as these can reduce the number of optical elements required.

The use of zoom optics is likewise enabled. This extends the possibilities for the use of the laser radar, since the operating angle of the laser radar can be flexibly adapted to prescribed defined tasks.

Fiber scanner 30 with fiber array 90 and linearly arranged fiber ends 90 can now be integrated at any desired location between the other components such that the design of the front end can be fashioned with substantially more flexibility.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A fiber optic scanner for transmitting and receiving optical signals, comprising:
   a light guide array comprising individual light guides arranged such that a first end comprises first ends of the individual light guides arranged in an image plane of collimating optics and a second end comprises second ends of the individual light guides arranged in a circular manner;
   a central light guide comprising a first end arranged at a center of the circularly arranged second ends of the individual light guides;
   a motor driven reflector arranged to guide light emerging from the circularly arranged ends of the individual light guides into the central light guide, and
   the central light guide further comprising two coaxially arranged cross sectional areas that are structured and arranged to guide transmitted light through a central one of the two coaxially arranged cross sectional areas and to guide received light through an outer one of the two coaxially arranged cross sectional areas.

2. The fiber optic scanner in accordance with claim 1, wherein the central cross sectional area of the central light guide comprises at least one of an optical guide and a fiber taper.

3. The fiber optic scanner in accordance with claim 1, further comprising a fiber optic coupler that is coupled to the central light guide and that is structured and arranged to separate the central cross sectional area and the outer cross sectional area of the central light guide from one another.

4. The fiber optic scanner in accordance with claim 3, wherein the central light guide comprises a bundle of optical fibers that are arranged such that a central optical fiber is surrounded by the remaining optical fibers of the bundle, so that the central optical fiber forms the central cross sectional area of the central light guide, and the remaining optical fibers of the bundle form the outer cross sectional area of the central light guide.

5. The fiber optic scanner in accordance with claim 4, wherein, at the fiber optic coupler, the central optical fiber is led out of the bundle.

6. The fiber optic scanner in accordance with claim 3, wherein the central light guide further comprises an inner optical fiber and a tubular light guide having an interior into which the optical fiber is inserted.

7. The fiber optic scanner in accordance with claim 6, wherein the tubular light guide has an expansion region in which the tubular light guide expands over a specific distance at the fiber optic coupler, and wherein the inner optical fiber is led out of the tubular light guide in the expansion region.

8. The fiber optic scanner in accordance with claim 3, wherein the outer cross sectional area of the central light guide is interrupted at the fiber optic coupler over a specific distance that is bridged by an optical projection, and wherein the central cross sectional area of the central light guide is led out of the outer cross sectional area in a region of this interruption.

9. The fiber optic scanner in accordance with claim 3, further comprising a detector and an optical switch connected between the fiber optic coupler and the detector, wherein the optical switch is synchronized with a light source to prevent light from the outer cross sectional area of the central light guide falling onto the detector during a transmission phase of the light source.

10. The fiber optic scanner in accordance with claim 9, wherein the optical switch comprises an incremental chopper disk arranged so that the optical signal of the outer cross sectional area of the central light guide passes through the incremental chopper disk at least one time.

11. The fiber optic scanner in accordance with claim 10, further comprising an optical projection structured and arranged to guide the optical signal through the incremental chopper disk.

12. The fiber optic scanner in accordance with claim 11, further comprising a motor driving the reflector, the motor having a shaft on which the incremental chopper disk is seated.

13. A range imaging camera including the fiber optic scanner in accordance with claim 1, and further comprising:
   a scanning device for two-dimensional scanning of a scene, wherein light coming from the scanning device is projected by the collimating optics onto the first ends of the individual light guides.

14. The range imaging camera in accordance with claim 13, wherein the collimating optics comprises at least two optical elements.

15. The range imaging camera in accordance with claim 14, wherein the two-dimensional scanning device is arranged in a beam path of the at least two optical elements.

16. The range imaging camera in accordance with claim 14, wherein the two-dimensional scanning device is arranged in a beam path of the collimating optics.

17. A method for transmitting and receiving optical signals, comprising:
   guiding light between a first end of an array formed by first ends of plural light guides arranged in an image plane of collimating optics and a second end of the array formed by second ends of the plural light guides arranged in a circular manner; and
   guiding transmitted light through a central portion of a coaxial light guide located at a center of the circularly arranged second ends of plural light guides and receiving reflected light through an outer portion of the coaxial light guide.

18. The method in accordance with claim 17, further comprising:
   guiding light from the second end of the array to the outer portion of the coaxial light guide; and
   guiding light from the central portion of the coaxial light guide to the second end of the array.

19. The method in accordance with claim 17, further comprising:
   separating the outer portion of the coaxial light guide from the central portion of the outer coaxial light guide;
   guiding a beam from the separated outer coaxial light guide toward a detector; and
   interrupting a beam path of the separated outer coaxial light guide before the beam reaches the detector.

20. The method in accordance with claim 19, wherein the beam path is interrupted a plurality of times before the beam reaches the detector.

21. The fiber optic scanner in accordance with claim 1, wherein the central light guide is a single central light guide structured and arranged to alternately transmit light to the second end of light guide array and receive light from the second end light guide array.

22. The method in accordance with claim 17, wherein the coaxial light guide is a single coaxial light guide structured and arranged to alternately transmit light to the second ends of the plural light guides and receive light from the second ends of the plural light guides.

* * * * *